Sept. 26, 1933.    G. T. BUDDLE    1,928,367
FISHHOOK DEVICE
Filed March 25, 1931
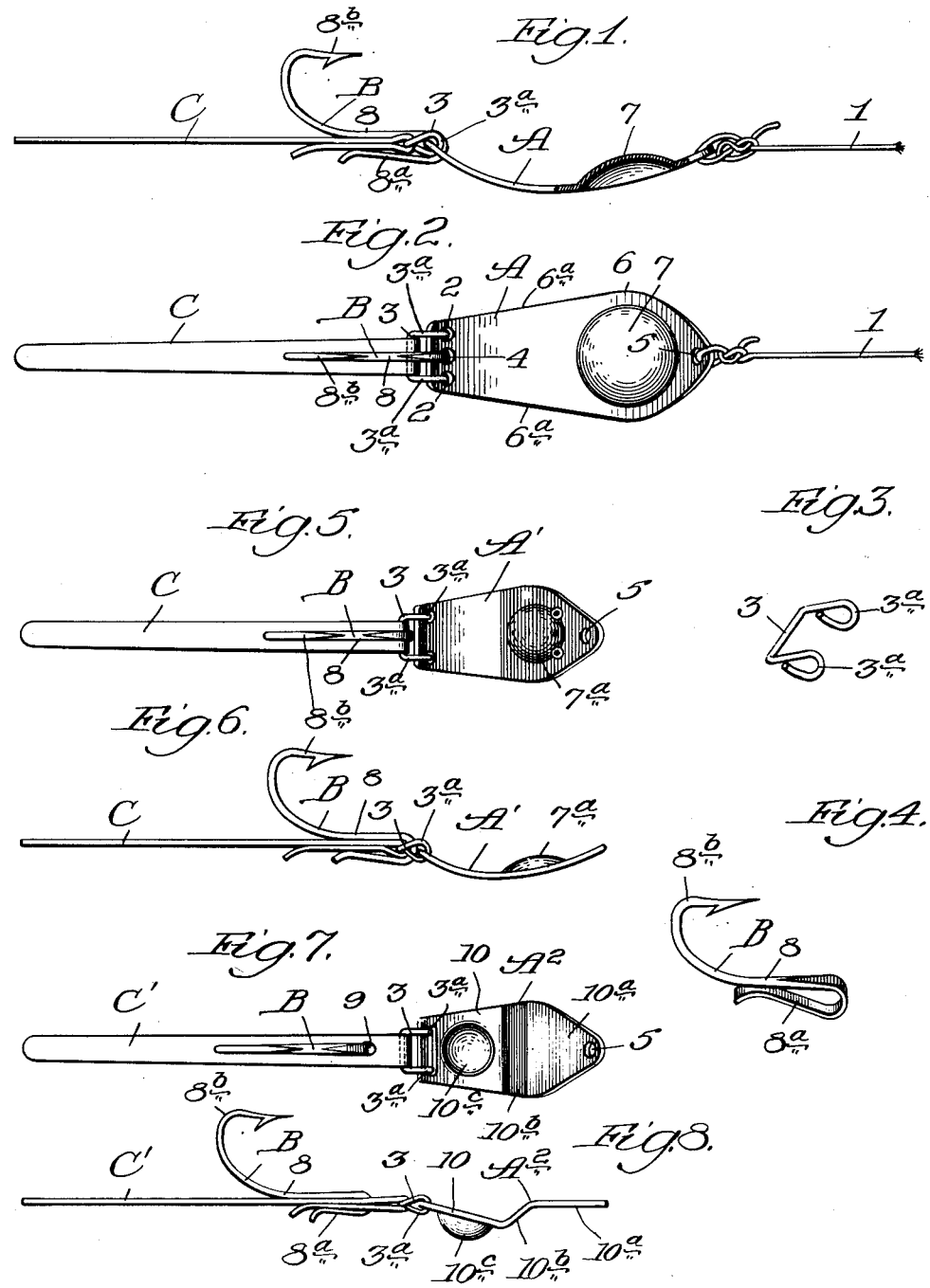
Inventor,
George T. Buddle,
By Dyrenforth, Lee, Chritton & Wiles
Attys Patented Sept. 26, 1933

1,928,367

UNITED STATES PATENT OFFICE 1,928,367

FISHHOOK DEVICE

George T. Buddle, Chicago, Ill., assignor of twenty-five per cent to Julius J. Sturm and twenty-five per cent to Minnie N. Sturm, Chicago, Ill.

Application March 25, 1931. Serial No. 525,290

7 Claims. (Cl. 43—42)

The present invention pertains to fish-hooks of the type adapted to a casting and reeling operation, but it may be used also for trolling operations.

The primary object is to provide a simple and effective device of the character indicated.

The invention is illustrated in the accompanying drawing, in which—

Figure 1 is a side elevational view (partly in section) of a device embodying the invention; Fig. 2, a plan view of the same; Fig. 3, a detail perspective view of a lure-attaching device employed; Fig. 4, a perspective view of a hook, proper, employed; Fig. 5, a plan view of a modified form of the invention; Fig. 6, a side elevational view of the device shown in Fig. 5; Fig. 7, a plan view of another modification; and Fig. 8, a side elevational view of the device shown in Fig. 7.

In the construction illustrated in Figs. 1–4, A designates a plate or supporting member which is attached at one end to a line 1; B designates a hook, proper, secured to the other end of plate A; and C designates a lure attached to the plate.

The plate A preferably is somewhat broad and has a longitudinal curvature, so that the plate presents a downwardly bowed appearance, when viewed from one lateral edge. The rear end of the plate is provided with a pair of perforations 2; and a small wire yoke 3 is hingedly connected with the rear end of the plate, the arms of the yoke being passed through the perforations 2 and formed into eyes 3ª, permitting the loose pivotal connection.

The rear end of the plate is further provided with a central perforation 4.

The front end of the plate is provided with a central perforation 5, at which point line 1 is attached.

The front portion of the plate has forwardly tapering edge-portions which meet at a point forming the front tip of the plate. Also, the plate has a wide portion at 6, from which the edges taper rearwardly, as indicated at 6ª.

The front portion of the plate preferably is slightly flattened, and has an upwardly struck hollow boss 7. That is, this boss is of part-spherical formation.

The hook, proper, B is shown as comprising a shank-portion 8 having its front end-portion formed to provide a resilient clip 8ª. The hook-portion is designated 8ᵇ. In the form shown in Fig. 1, the spring clip portion of the hook is slipped through the central perforation 4, and the front portion of the lure C is clamped between the shank of the hook and the flattened end-portion which serves as a spring clip.

It may be stated that when the device is drawn through the water, the plate A practically rides upon the water, but the upwardly bulged boss 7 of the hook tends to cause a wobbling action. This is somewhat enhanced by the taper edges 6ª of the rear portion of the plate.

In the modification shown in Fig. 5, A' designates a plate of somewhat different form; 3 designates a yoke-like connecting link of the form already described; and B designates a hook of the form already described. In this case, both the lure C and the hook B are connected with the cross-member of the yoke 3. That is, the hook is pivotally connected with the plate A' through the medium of the pivoted yoke-like link 3.

The plate A' is shown as somewhat smaller than the plate A. It is provided with a small dome 7ª similar to the dome shown on the front portion of the plate A.

In the modification shown in Fig. 7, A² designates the plate portion of the device; and 3 designates a link like the one already described, while C' designates a lure. The lure is shown as a strip of buckskin, for example, which has one end-portion looped about the member 3. The folded portion of the member C' is provided with a perforation 9. The clip portion of the hook is passed through the perforation, and the hook is thus clamped onto the lure.

The lure may be any suitable device. In the form shown in Figs. 1 and 2, the lure may, if desired, consist of a strong piece of rind; or it may consist of a strip of buckskin.

The plate portion of the device may be painted and marked in any desired manner.

Referring, again, to the modifications shown in Figs. 7 and 8, the plate is shown as comprising a rear portion 10, a front portion 10ª and an intervening inclined portion 10ᵇ. Otherwise, the plate is rather flat in form, excepting that the portion 10 is provided with a downwardly struck hollow boss 10ᶜ, the purpose of which is to cause the device to wobble as it is drawn through the water.

The front portions of the plates A' and A² are provided with perforations 5 which correspond with the perforation 5 shown in Fig. 2.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A fish-hook device comprising a plate having a yoke-like link connected with its rear end; a lure connected with said link; and a hook having a spring-clip portion connected with the rear portion of the plate and engaging said lure.

2. A device as specified in claim 1, in which the plate tapers rearwardly and its front portion forms a base flange around an upwardly struck hollow boss.

3. A fish-hook device comprising a plate provided with an upwardly struck hollow boss at a position intermediate the front tip and the middle of said plate; a yoke-like link connected with the rear end of said plate; a lure connected with said link; and a hook having a spring-clip portion connected with the rear portion of the plate, said lure being held in position by the spring-clip portion of the hook.

4. An artificial bait comprising: a body-member, a lure attached to said body-member, and a hook having an integrally formed spring-clip on its shank portion, which is snapped over a portion of said lure.

5. A bait as specified in claim 4, in which the connecting end-portion of said lure is doubled back over itself and the spring-clip engages the double portion thereo.

6. An artificial bait comprising: a body-member; a perforated lure connected to said body-member and doubled back on itself; and a combined hook and integrally formed spring-clip, said clip passing through the perforations in said lure and snapped over part of the doubled portion of said lure.

7. An artificial bait comprising: a body-member provided at its rear portion with a cross-bar; a lure threaded around said cross-bar and doubled back over itself; and a combined hook and integrally formed spring-clip, said clip engaging said bar and snapped over a double thickness of said lure.

GEORGE T. BUDDLE.